(12) United States Patent
Kim et al.

(10) Patent No.: US 9,494,727 B2
(45) Date of Patent: Nov. 15, 2016

(54) LIGHT-CONDENSING FILM HAVING SUPERIOR ANTI-ADHESION PERFORMANCE AND SUPERIOR MOIRÉ PREVENTION EFFECTS, BACKLIGHT UNIT COMPRISING SAME, AND DISPLAY DEVICE COMPRISING THE BACKLIGHT UNIT

(75) Inventors: Kyung-Mo Kim, Daejeon (KR); Soo-Hee Jung, Seoul (KR); Sang-Choll Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 141 days.

(21) Appl. No.: 13/634,807

(22) PCT Filed: Apr. 12, 2011

(86) PCT No.: PCT/KR2011/002578
§ 371 (c)(1),
(2), (4) Date: Sep. 13, 2012

(87) PCT Pub. No.: WO2011/129587
PCT Pub. Date: Oct. 20, 2011

(65) Prior Publication Data
US 2013/0003410 A1    Jan. 3, 2013

(30) Foreign Application Priority Data

Apr. 13, 2010 (KR) .................. 10-2010-0033849
Apr. 11, 2011 (KR) .................. 10-2011-0033197

(51) Int. Cl.
*G02B 27/10* (2006.01)
*F21V 8/00* (2006.01)
*G02B 5/02* (2006.01)

(52) U.S. Cl.
CPC .......... *G02B 6/0053* (2013.01); *G02B 5/0215* (2013.01); *G02B 5/0231* (2013.01); *G02B 5/0294* (2013.01)

(58) Field of Classification Search
CPC ................ H04N 13/0404; H04N 13/0415; B41J 2/1637; B41J 2/1643; G02B 27/2214; G02B 3/005; G02B 3/0056; G02B 3/0062; G02B 3/0006; G02B 6/0053; G02B 6/0078
USPC ........................................................ 359/619
See application file for complete search history.

(56) References Cited

U.S. PATENT DOCUMENTS 6,950,234 B1    9/2005 Onishi
7,719,636 B2    5/2010 Kim et al.
(Continued)

FOREIGN PATENT DOCUMENTS

CN    1341216 A    3/2002
CN    101216639 A    7/2008
(Continued)

*Primary Examiner* — Alicia M Harrington
(74) *Attorney, Agent, or Firm* — Dentons US LLP

(57) ABSTRACT

Provided are a condensing film, a backlight unit including the condensing film, and a display device including the backlight unit. The condensing film includes a plurality of lens structures extending in an extension direction on a surface thereof, a first protrusion part disposed on the lens structures and comprising a plurality of protrusions arrayed in the extension direction of the lens structure, and a second protrusion part disposed on the lens structures and comprising a plurality of protrusions arrayed in an array direction forming a certain angle with the extension direction of the lens structure.

17 Claims, 3 Drawing Sheets

(56) References Cited

U.S. PATENT DOCUMENTS

| | | |
|---|---|---|
| 8,134,781 B2 | 3/2012 | Han et al. |
| 2002/0012248 A1* | 1/2002 | Campbell ............... G02B 5/00 362/331 |
| 2008/0225207 A1 | 9/2008 | Kim et al. |
| 2008/0232113 A1 | 9/2008 | Horii et al. |
| 2010/0073962 A1 | 3/2010 | Joo et al. |
| 2010/0097706 A1 | 4/2010 | Lor et al. |
| 2010/0321787 A1* | 12/2010 | Han et al. .................... 359/641 |

FOREIGN PATENT DOCUMENTS

| | | |
|---|---|---|
| CN | 101373227 A | 2/2009 |
| JP | 2010-020056 A | 1/2010 |
| KR | 10-0697613 | 3/2007 |
| KR | 10-0840572 | 6/2008 |
| KR | 10-2009-0094777 | 9/2009 |
| TW | M352035 | 3/2009 |
| WO | 2009/110736 | 9/2009 |

* cited by examiner

LIGHT-CONDENSING FILM HAVING SUPERIOR ANTI-ADHESION PERFORMANCE AND SUPERIOR MOIRÉ PREVENTION EFFECTS, BACKLIGHT UNIT COMPRISING SAME, AND DISPLAY DEVICE COMPRISING THE BACKLIGHT UNIT

This application is a National Stage Entry of International Application No. PCT/KR2011/002578, filed Apr. 12, 2011, and claims the benefit of Korean Application Nos. 10-2010-0033849, filed on Apr. 13, 2010, and 10-2011-0033197, filed on Apr. 11, 2011, which are hereby incorporated by reference in their entirety for all purposes as if fully set forth herein.

TECHNICAL FIELD

The present invention relates to a condensing film, a backlight unit including the condensing film, and a display device including the backlight unit, and more particularly, to a condensing film that efficiently prevents a moiré and blocking between films, a backlight unit including the condensing film, and a display device including the backlight unit.

BACKGROUND ART

In general, a liquid crystal display (LCD) includes an upper substrate including a common electrode and color filters, a lower substrate including thin film transistors and pixel electrodes, and a liquid crystal material injected between the upper and lower substrates. Different electric potentials are applied to the pixel electrode and the common electrode to form an electrical field and change an arrangement of liquid crystal molecules, thereby adjusting transmissivity of light and displaying an image.

Such LCDs do not themselves produce light, and thus, they require a source of illumination in order to produce a visible image. To this end, backlight units may be used therefor. A backlight unit includes a light source for emitting light, a spread plate or light guide plate for converting a line or point light source into a surface light source, and a plurality of optical films for improving optical characteristics. Examples of an optical film used in a backlight unit include a condensing film for directing light forward to increase brightness, a spread film for hiding a defect in the rear surface of a backlight or a bright line of a light source, and a protective film for protecting an optical film from an external impact.

A condensing film, a spread film, and a protective film may be stacked. In this case, the stacked films may be closely attached to each other, thereby causing the so-called blocking, a surface defect. FIG. 1 is an image illustrating wet-out and blocking occurring when a protective film is disposed on a condensing film. In this case, an image quality of a display device may be degraded. To prevent blocking between films, protrusions spaced apart from one another by a constant distance may be arrayed on a peak of a condensing film including a lenticular lens or a prismatic lens. In this case, blocking between films can be prevented, but a lens structure and protrusions may form a moiré, thereby degrading image quality. A moiré can be prevented by irregularly arraying protrusions. However, it is technically difficult to fabricate a mold for forming protrusions irregularly arrayed on a lens structure. A condensing film including a lenticular lens or a prismatic lens may be formed using a mold having an intaglio that is formed using a bite. Thus, to fabricate a condensing film including irregularly arrayed protrusions, a frequency of processing a mold with a bite should be irregularly changed, which is difficult because the bite rotates at high speed.

DISCLOSURE

Technical Problem

An aspect of the present invention provides a condensing film, a backlight unit including the condensing film, and a display device including the backlight unit, which prevent a moiré and blocking between films.

Technical Solution

According to an aspect of the present invention, there is provided a condensing film including: a plurality of lens structures extending in an extension direction on a surface thereof; a first protrusion part disposed on the lens structures and including a plurality of protrusions arrayed in the extension direction of the lens structure; and a second protrusion part disposed on the lens structures and including a plurality of protrusions arrayed in an array direction forming a certain angle with the extension direction of the lens structure.

According to another aspect of the present invention, there is provided a backlight unit including: a light source; a light guide plate disposed at a side of the light source, and controlling a path of light emitted from the light source; and the condensing film disposed over the light guide plate.

According to another aspect of the present invention, there is provided a backlight unit including: a light source; a spread plate disposed over the light source, and spreading light emitted from the light source; and the condensing film disposed over the spread plate.

According to another aspect of the present invention, there is provided a display device including the backlight unit.

Advantageous Effects

According to the embodiments of the present invention, the condensing film has the blocking prevention properties to prevent wet-out or a surface defect, and has the moiré prevention properties to improve image quality.

In addition, since the condensing film can be simply manufactured, productivity and reproducibility thereof are improved to maintain a stable quality.

DESCRIPTION OF DRAWINGS

The above and other aspects, features and other advantages of the present invention will be more clearly understood from the following detailed description taken in conjunction with the accompanying drawings, in which.

BEST MODE

Figure 1:
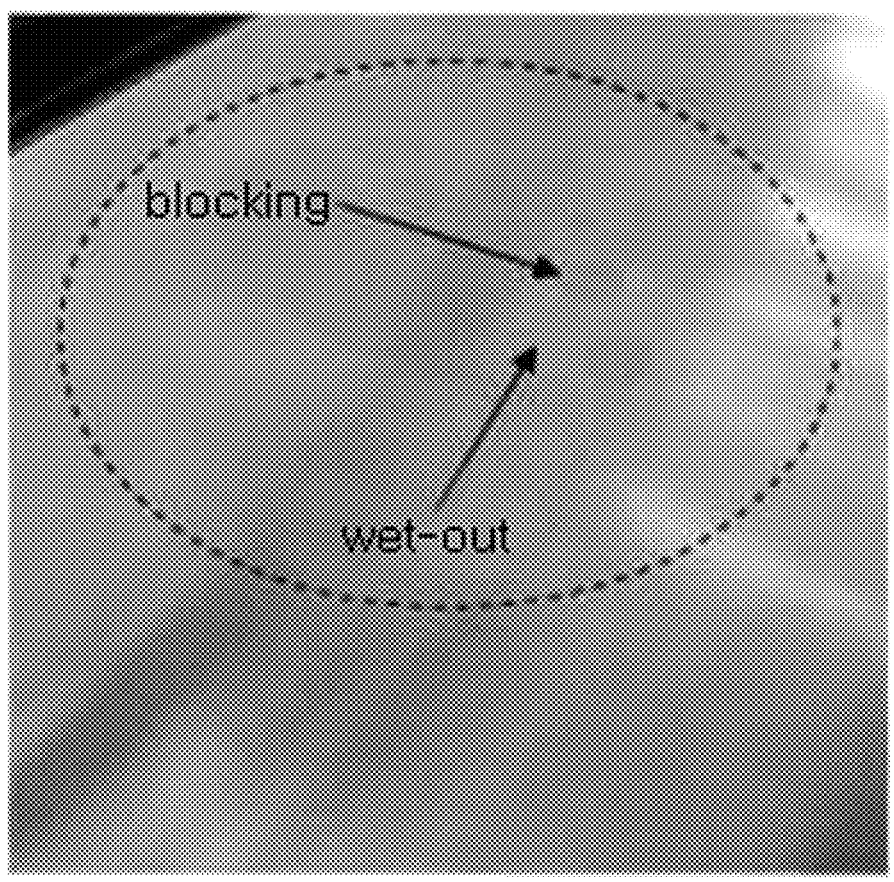
FIG. 1 is an image illustrating wet-out and blocking occurring when a protective film is disposed on a condensing film.

Exemplary embodiments of the present invention will now be described in detail with reference to the accompanying drawings. The accompanying drawings are exemplary drawings used to describe the exemplary embodiments of the present invention, and thus, the present invention is not limited thereto. In the drawings, the dimensions of components and regions may be exaggerated for clarity of illustration.

According to an embodiment of the present invention, a condensing film includes protrusions arrayed in an extension direction of lens structures, and protrusions arrayed in an oblique direction with relation to the extension direction of the lens structures, to prevent blocking between films without a moiré.

Figure 2:
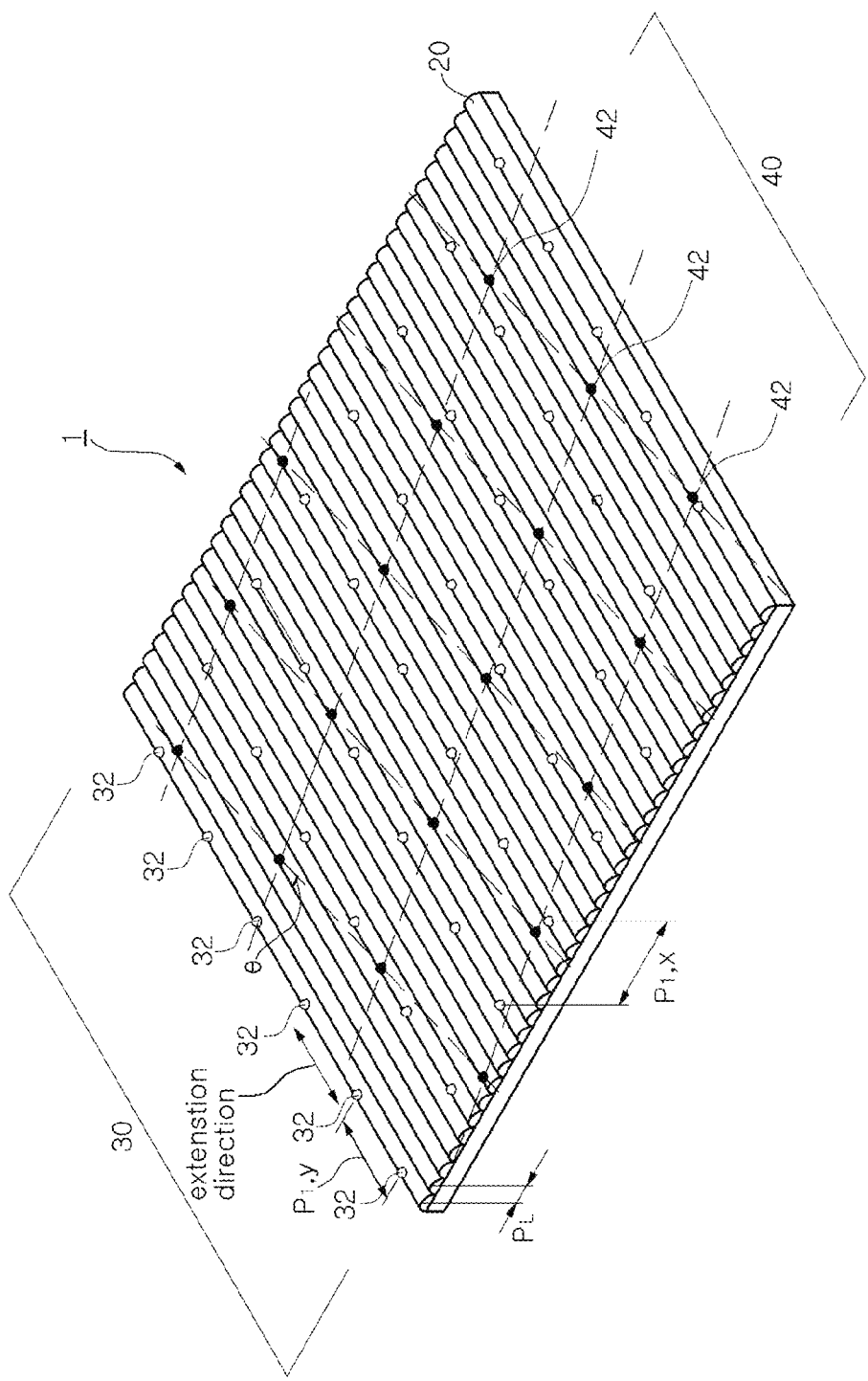
FIG. 2 is a schematic perspective view illustrating a condensing film according to an embodiment of the present invention.

FIG. 2 is a perspective view illustrating a condensing film according to an embodiment of the present invention.

Referring to FIG. 2, a condensing film 1 according to the current embodiment includes first and second protrusion parts 30 and 40, which have different array directions on lens structures 20, to effectively prevent a moiré and blocking between films. In addition, since the first and second protrusion parts 30 and 40 are regularly arrayed, it is unnecessary to change a frequency of processing a mold for a film. Thus, the condensing film 1 can be efficiently manufactured and reproduced to thereby maintain a stable quality.

In more detail, the condensing film 1 includes the lens structures 20 extending in a certain direction on a surface thereof, and the first and second protrusion parts 30 and 40 having the different array directions on the lens structures 20.

The lens structures 20 guide light emitted from a light source to a predetermined direction to improve brightness in a visible region. For example, the lens structure 20 may be a prismatic lens, a lenticular lens, or a combination thereof, which extends in a predetermined direction. The prismatic lens may be a lens having a triangular cross section, or a modified prism having a rounded peak. The lenticular lens may be any lens having a curved cross section such as a hemispheric cross section, a hyperbolic cross section, or a parabolic cross section.

However, the lens structure 20 is not limited thereto. For example, the lens structure 20 may have a pitch ranging from about 15 μm to about 80 μm, and a height ranging from about 5 μm to about 40 μm. If the pitch is smaller than about μm, the quantity of lens 20 edges per unit area may increase to degrade brightness performance of the condensing film 1, and a high precision mold for the lens structure 20 is required. If the pitch is greater than about 100 μm, the possibility of the occurrence of a moiré between the lens structures 20 and a panel increases. When the height of the lens structure 20 ranges from about 30% to about 50% of the pitch thereof, particularly, ranges from about 5 μm to about μm, an acceptable light collecting performance may be obtained.

The first and second protrusion parts 30 and 40 are disposed at the upper side of the lens structures 20 to function as spacers between films, thereby preventing blocking between films. The first protrusion part 30 includes a plurality of protrusions 32 arrayed in the extension direction of the lens structure 20, and the second protrusion part 40 includes a plurality of protrusions 42 arrayed in a direction forming a predetermined angle with the extension direction of the lens structure 20.

As such, since the first and second protrusion parts 30 and 40 have the different array directions, regularity of the first and second protrusion parts 30 and 40 is reduced. Therefore the complex pattern formed by the first and second protrusion parts 30 and 40 takes effect to reduce a moiré effect.

An angle θ between the extension direction of the lens structure 20 and the array direction of the second protrusion part 40 may preferably be in a range of $10° \leq \theta \leq 40°$, and more preferably, in a range of $15° \leq \theta \leq 25°$. When the angle θ is in the above-described range, the moiré prevention effect is maximized.

The protrusions 32 constituting the first protrusion part 30 may be spaced apart from each other by a constant distance, particularly, may be arrayed to satisfy Formula 1.

$$P_{1,x} = P_{1,y} = n_1 \times P_L \qquad \text{Formula 1}$$

where $P_{1,x}$ denotes a distance between the protrusions 32 of the first protrusion part 30 in a direction perpendicular to the extension direction of the lens structure 20, $P_{1,y}$ denotes a distance between the protrusions 32 of the first protrusion part 30 in the extension direction of the lens structure 20, $P_L$ denotes a pitch between the lens structures 20, and $n_1$ denotes an integer of 1 or greater.

In particular, $n_1$ may preferably be in a range from 3 to 7, and more preferably, be in a range from 4 to 6. If $n_1$ is or smaller, the brightness performance of the condensing film 1 may be degraded. If $n_1$ is 8 or greater, blocking performance of the condensing film 1 may be significantly degraded.

The protrusions 42 constituting the second protrusion part 40 may be spaced apart from each other by constant distance, particularly, may be arrayed to satisfy Formulas 2 and 3.

$$P_{2,x} = (n_{2,x} \times P_L)/\cos \theta \qquad \text{Formula 2}$$

$$P_{2,y} = (n_{2,y} \times P_L)/\sin \theta \qquad \text{Formula 3}$$

where $P_{2,x}$ denotes a distance between the protrusions 42 of the second protrusion part 40 in a direction perpendicular to the array direction of the second protrusion part 40, $P_{2,y}$ denotes a distance between the protrusions 42 of the second protrusion part 40 in the array direction of the second protrusion part 40, $P_L$ denotes the pitch between the lens structures 20, $n_{2,y}$ denotes an integer, $n_{2,x}$ denotes an integer closest to $n_{2,y}/\tan \theta$, and θ denotes an angle between the array direction of the second protrusion part 40 and the extension direction of the lens structure 20.

The second protrusion part 40 may satisfy Formula 4.

$$5 \leq n_{2,y}/\sin \theta \leq 18 \qquad \text{Formula 4}$$

where $n_{2,y}$ denotes an integer, and θ denotes the angle between the array direction of the second protrusion part 40 and the extension direction of the lens structure 20.

The protrusions 32 of the first protrusion part 30 and the protrusions 42 of the second protrusion part 40 may have a diameter ranging from about 10% to about 60% of the pitch $P_L$ between the lens structures 20. For example, when the pitch $P_L$ is about 50 μm, the diameter of the protrusions 32 and 42 may preferably be in a range from about 5 μm to about 30 μm, and more preferably, be about 12 μm. If the diameter of the protrusions 32 and 42 is less than about 10% of the pitch $P_L$, a blocking prevention effect of the condensing film 1 may be small. If the diameter of the protrusions 32 and 42 is greater than about 60% of the pitch $P_L$, molding characteristics and stability of the condensing film 1 may be jeopardized.

The protrusions 32 of the first protrusion part 30 and the protrusions 42 of the second protrusion part 40 may have a height ranging from about 10% to about 100% of the diameter of the protrusions 32 and 42. If the height of the protrusions 32 and 42 is less than about 10% of the diameter of the protrusions 32 and 42, the blocking prevention effect of the condensing film 1 may be small. If the height of the protrusions 32 and 42 is greater than about 100% of the diameter of the protrusions 32 and 42, the molding characteristics of the condensing film 1 may be jeopardized. In particular, the height of the protrusions 32 and 42 may be in a range from about 1 μm to about 20 μm, and preferably, may be in a range from about 1.5 μm to about 10 μm.

The condensing film 1 may be formed by molding a thermosetting resin with a mold having intaglios corresponding to the shapes of the lens structure 20 and the protrusions 32 and 42, and by curing the thermosetting resin. In this case, the intaglio corresponding to the shape of the lens structure 20 may be formed using any lens structure forming method well known in the art, such as a mechanical cutting method, a photoresist reflow method, a bead coating method, and a laser etching method. The intaglio corresponding to the shape of the protrusions 32 and 42 may be formed by performing a bite process or a laser process on a mold having the intaglio corresponding to the shape of the lens structure 20. Preferably, the intaglio corresponding to the shape of the protrusions 32 and 42 may be formed using a laser process. A laser process is a high precision process adapted for forming an intaglio corresponding to a minute structure such as the protrusions 32 and 42, and is performed after a laser beam contacts a target surface. Thus, even when a mold has an intaglio corresponding to a 3-dimensional structure such as the lens structure 20, a secondary shape having a constant depth from curved surfaces of the intaglio can be formed in the mold. In the laser process, an optical system may be adjusted to control a shape, an area, and a depth of a metal to be removed according to each pulse, and thus, a point process can be freely performed, and an intaglio corresponding to a protrusion can be accurately formed at an intended position.

In more detail, for example, the condensing film 1 may be formed by forming an intaglio corresponding to the first protrusion part 30 in a mold having an intaglio corresponding to the lens structure 20, by changing a bite travelling direction or a laser travelling direction to form an intaglio corresponding to the second protrusion part 40, and by molding and curing a thermosetting resin.

Accordingly, the condensing film 1 is applied to a backlight unit to thereby provide excellent blocking and moiré prevention effects, and thus, an improved image can be formed.

The condensing film 1 can be applied to any backlight unit. That is, the condensing film 1 can be applied to both an edge-type backlight unit in which a light source is disposed at a side of a display panel, and a direct-type backlight unit in which a light source is disposed under a display panel.

Figure 3:
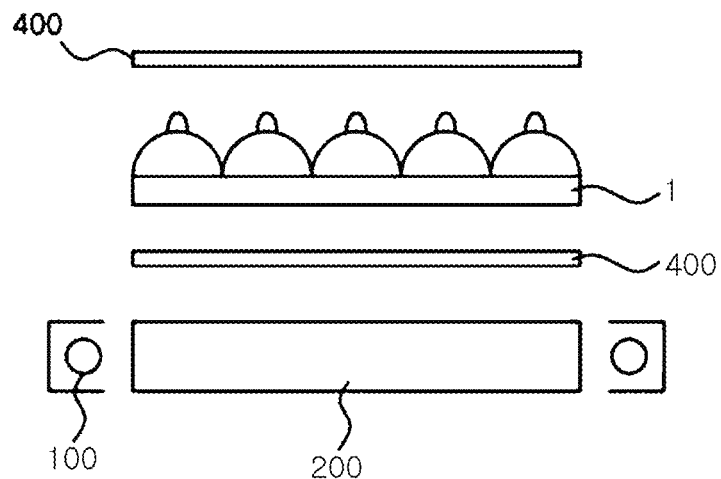
FIG. 3 is a view illustrating a backlight unit including a condensing film according to an embodiment of the present invention.
Figure 4:
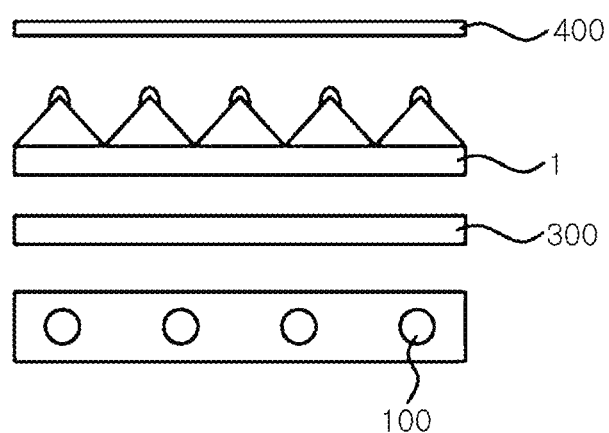
FIG. 4 is a view illustrating a backlight unit including a condensing film according to another embodiment of the present invention.

FIG. 3 is a view illustrating a backlight unit including a condensing film according to an embodiment of the present invention, while FIG. 4 is a view illustrating a backlight unit including a condensing film according to another embodiment of the present invention.

Referring to FIG. 3, a backlight unit according to an embodiment of the present invention includes a light source 100, a light guide plate 200 disposed at a side of the light source 100 to guide light emitted from the light source 100; and the condensing film 1 disposed over the light guide plate 200.

Referring to FIG. 4, a backlight unit according to another embodiment of the present invention includes the light source 100, a spread plate 300 disposed over the light source 100 to spread light emitted from the light source 100; and the condensing film 1 disposed over the spread plate 300.

The backlight unit may further include a spread film 400 that is disposed at the upper side and/or the lower side of the condensing film 1 to hide the light source 100. A protective film (not shown) may be disposed over the condensing film 1 to protect a lens structure.

Although one condensing film is provided as the condensing film 1 in FIGS. 3 and 4, the backlight unit may include two or more condensing films as the condensing film 1.

The backlight unit may be applied to a display device such as a liquid crystal display device.

MODE FOR INVENTION

Hereinafter, exemplary embodiments of the present invention will be described in more detail.

EMBODIMENT

Intaglios corresponding to lens structures were formed in a roll-shaped mold with a diamond bite that had a prismatic lens shape with a rounded peak, and then, intaglios corresponding to a first protrusion part and a second protrusion part were formed with pulse laser. Protrusions constituting the first protrusion part were horizontally and vertically spaced apart from each other by about 250 μm, and were arrayed in an extension direction of the lens structure. Protrusions constituting the second protrusion part were arrayed in a direction that forms an angle of about 21° with respect to an array direction of the first protrusion part, that is, with the extension direction of the lens structure. A distance ($P_{2, y}$) between the protrusions of the second protrusion part in an array direction of the second protrusion part was about 418.56 μm, and a distance ($P_{2, x}$) between the protrusions of the second protrusion part in a direction perpendicular to the array direction of the second protrusion part was about 428.46 μm.

A UV curable resin having a refractive index of about 1.54 was introduced between the mold and a polyethyelene-terepthalate (PET) base material, and was cured to form a condensing film.

The structure of the condensing film was as follows:
(1) Cross section of lens structure: modified prism with peak having curved surface
(2) Pitch ($P_L$) of lens structure: 50 μm
(3) Distance ($P_{1, x}$=$P_{1, y}$) between protrusions of first protrusion part: 250 μm
(4) Diameter of protrusions of first protrusion part: 12 μm
(5) Height of protrusions of first protrusion part: 6 μm
(6) Angle (θ) between array direction of second protrusion part and extension direction of lens structure: 21°
(7) Distance ($P_{2, y}$) between protrusions of second protrusion part in array direction of second protrusion part: 418.56 μm (8) Distance ($P_{2,x}$) between protrusions of second protrusion part in perpendicular direction to array direction of second protrusion part: 428.46 μm (9) Diameter of protrusions of second protrusion part: 12 μm

(10) Height of protrusions of second protrusion part: 6 μm

FIRST COMPARATIVE EXAMPLE

Intaglios corresponding to lens structures were formed in a roll-shaped mold with a diamond bite that had a prismatic lens shape with a rounded peak, and then, intaglios corresponding to a protrusion part were formed with a pulse laser such that protrusions constituting the protrusion part were horizontally and vertically spaced apart from each other by about 200 μm, and were arrayed in an extension direction of the lens structure.

A UV curable resin having a refractive index of about 1.54 was introduced between the mold and a PET base material, and was cured to form a condensing film.

The structure of the condensing film was as follows:

(1) Cross section of lens structure: modified prism with peak having curved surface (radius of curvature of 4 μm)

(2) Pitch ($P_L$) of lens structure: 50 μm (3) Distance between protrusions of protrusion part: 200 μm (4) Diameter of protrusions of protrusion part: 12 μm (5) Height of protrusions of protrusion part: 6 μm

SECOND COMPARATIVE EXAMPLE

A condensing film was formed in the same manner as that of the embodiment except for the following: Protrusions constituting a second protrusion part were arrayed in a direction that forms an angle of about 5° with respect to an array direction of a first protrusion part, that is, with an extension direction of lens structures. A distance ($P_{2,y}$) between the protrusions of the second protrusion part in an array direction of the second protrusion part was about 573.69 μm, and a distance ($P_{2,x}$) between the protrusions of the second protrusion part in a direction perpendicular to the array direction of the second protrusion part was about 551.10 μm.

THIRD COMPARATIVE EXAMPLE

A condensing film was formed in the same manner as that of the embodiment except for the following: Protrusions constituting a second protrusion part were arrayed in a direction that forms an angle of about 45° with respect to an array direction of a first protrusion part, that is, with an extension direction of lens structures. A distance ($P_{2,y}$) between the protrusions of the second protrusion part in an array direction of the second protrusion part was about 494.97 μm and a distance ($P_{2,x}$) between the protrusions of the second protrusion part in a direction perpendicular to the array direction of the second protrusion part was about 494.97 μm.

FOURTH COMPARATIVE EXAMPLE

A condensing film was formed in the same manner as that of the embodiment except that a distance between protrusions of a first protrusion part was about 100 μm, that is, $n_1=2$.

FIFTH COMPARATIVE EXAMPLE

A condensing film was formed in the same manner as that of the embodiment except that a distance between protrusions of a first protrusion part was about 500 μm, that is, $n_1=10$.

SIXTH COMPARATIVE EXAMPLE

A condensing film was formed in the same manner as that of the embodiment except for the following: A distance ($P_{2,y}$) between protrusions of a second protrusion part in an array direction of the second protrusion part was about 139.52 μm, and a distance ($P_{2,x}$) between the protrusions of the second protrusion part in a direction perpendicular to the array direction of the second protrusion part was about 160.67 μm.

SEVENTH COMPARATIVE EXAMPLE

A condensing film was formed in the same manner as that of the embodiment except for the following: A distance ($P_{2,y}$) between protrusions of a second protrusion part in an array direction of the second protrusion part was about 976.65 μm, and a distance ($P_{2,x}$) between the protrusions of the second protrusion part in a direction perpendicular to the array direction of the second protrusion part was about 964.03 μm.

FIRST EXPERIMENTAL EXAMPLE

Measurement of Blocking Prevention Properties

PET films were placed on the condensing films formed according to the embodiment and the first to seventh comparative examples, and then, a load of 5 kgf/cm2 was applied to the PET films for 24 hours at a temperature of about 85° C. and a humidity level of about 95%. After 24 hours, the occurrence of blocking between the condensing films and the PET films was checked by naked eye. Checking results are shown in the table below. x denotes the occurrence of blocking, while 0 denotes the absence of blocking.

SECOND EXPERIMENTAL EXAMPLE

Measurement of Moiré Prevention Properties

Each of the condensing films formed according to the embodiment and the first to seventh comparative examples were provided in duplicate to be perpendicular to each other on a light guide plate of a backlight unit. That is, the extension directions of the lens structures of the condensing films were perpendicular to each other. After that, LCD panels were placed thereon, and the occurrence of a moiré was checked by naked eye.

The LCD panels were 26-inch, 32-inch, and 37-inch full HD (FHD) panels.

The occurrence of a moiré was checked in four modes, that is, in a white mode in which all pixels were turned on, in a 1 dot mode such as a check pattern in which a turned on pixel was alternately disposed with a turned off pixel, a 1 line vertical mode such as a vertical strip pattern in which a column of turned on pixels was alternately disposed with a column of turned off pixels, and a 1 line horizontal mode such as a horizontal strip pattern in which a row of turned on pixels was alternately disposed with a row of turned off pixels. Results of the checking are shown in the table below.

THIRD EXPERIMENTAL EXAMPLE

Measurement of Brightness

Each of the condensing films formed according to the embodiment and the first to seventh comparative examples were provided in duplicate to be perpendicular to each other on a light guide plate of a backlight unit. That is, the extension directions of the lens structures of the condensing films were perpendicular to each other. Then, brightness was measured in the top centers of the condensing films. A Topcon BM7™ was used as a brightness measuring device. Ratios of brightness in the first to seventh comparative examples to brightness in the embodiment were expressed as percentages in the table below.

TABLE

| CATEGORY | COMPARISON OF BRIGHTNESS | ANTI BLOCKING | MOIRÉ |
|---|---|---|---|
| EMBODIMENT | 100 | ○ | NONE |
| COMPARATIVE EX 1 | 100 | ○ | 1 DOT MODE, MOIRÉ IN 32/37" FHD |
| COMPARATIVE EX 2 | 100 | ○ | 1 LINE VERTICAL MODE, MOIRÉ IN 32/37" FHD |
| COMPARATIVE EX 3 | 100 | ○ | 1 DOT MODE, MOIRÉ IN 26/32" FHD |
| COMPARATIVE EX 4 | 95 | ○ | 1 DOT MODE, MOIRÉ IN 32/37" FHD |
| COMPARATIVE EX 5 | 101 | X | NONE |
| COMPARATIVE EX 6 | 98 | ○ | NONE |
| COMPARATIVE EX 7 | 100 | ○ | 1 DOT MODE, MOIRÉ IN 32" FHD |

While the present invention has been shown and described in connection with the exemplary embodiments, it will be apparent to those skilled in the art that modifications and variations can be made without departing from the spirit and scope of the invention as defined by the appended claims.

The invention claimed is:

1. A condensing film comprising:
   a plurality of lens structures extending in an extension direction on a surface thereof;
   a first protrusion part disposed on the lens structures and comprising a first plurality of protrusions arrayed in the extension direction of the lens structures; and
   a second protrusion part disposed on the lens structures and comprising a second plurality of protrusions arrayed in an array direction, the array direction of the second protrusion part forming an angle $\theta$ with the extension direction of the lens structures,
   wherein both of the first protrusion part and the second protrusion part are on the upper side of the lens structures to function as spacers,
   wherein in at least one lens structure, at least one protrusion of the second plurality of protrusions is between two adjacent protrusions of the first plurality of protrusions, and a distance between the at least one protrusion of the second plurality of protrusions and a first of the adjacent protrusions is different from a distance between the at least one protrusion of the second plurality of protrusions and a second of the adjacent protrusions,
   wherein the angle $\theta$ satisfies Formula below:

$$\text{Formula} = 15° \leq \theta \leq 25°,$$

the first protrusion part satisfies Formula 1 below, $$P_{1,x} = P_{1,y} = n_1 \times P_L, \quad \text{[Formula 1]}$$

the second protrusion part satisfies Formulas 2 and 3 below, $$P_{2,x} = (n_{2,x} \times P_L)/\cos\theta > 0, \quad \text{[Formula 2]}$$

$$P_{2,y} = (n_{2,y} \times P_L)/\sin\theta > 0, \quad \text{[Formula 3]}$$

where: $P_{1,x}$ denotes a distance between the protrusions of the first protrusion part in a direction perpendicular to the extension direction of the lens structures,
   $P_{1,y}$ denotes a distance between the protrusions of the first protrusion part in the extension direction of the lens structures,
   $n_1$ denotes an integer of 1 or greater,
   $P_L$ denotes a pitch between the lens structures,
   $P_{2,x}$ denotes a distance between the protrusions of the second protrusion part in a direction perpendicular to the array direction of the second protrusion part,
   $n_{2,x}$ denotes an integer closest to $n_{2,y}/\tan\theta$,
   $\theta$ denotes an angle between the array direction of the second protrusion part and the extension direction of the lens structures,
   $P_{2,y}$ denotes a distance between the protrusions of the second protrusion part in the array direction of the second protrusion part, and
   $n_{2,y}$ denotes an integer.

2. The condensing film of claim 1, wherein $n_1$ ranges from 3 to 7.

3. The condensing film of claim 1, wherein the second protrusion part satisfies Formula 4 below, $$5 \leq n_{2,y}/\sin\theta \leq 18. \quad \text{[Formula 4]}$$

4. The condensing film of claim 1, wherein the protrusions of the first and second protrusion parts have a diameter ranging from 10% to 60% of a pitch between the lens structures.

5. The condensing film of claim 1, wherein the protrusions of the first and second protrusion parts have a height ranging from 10% to 100% of a diameter of the protrusions.

6. The condensing film of claim 5, wherein the height of the protrusions ranges from 1 μm to 20 μm.

7. The condensing film of claim 1, wherein the at least one protrusion of the second plurality of protrusions and the adjacent protrusions are positioned at a peak of the one lens structure.

8. The condensing film of claim 1, wherein at least one protrusion of the second plurality of protrusions is positioned at a peak of the one lens structure.

9. A backlight unit comprising:
   a light source;
   a light guide plate disposed at a side of the light source, and controlling a path of light emitted from the light source; and
   a condensing film disposed over the light guide plate,
   wherein the condensing film comprises:
   a plurality of lens structures extending in an extension direction on a surface thereof;
   a first protrusion part disposed on the lens structures and comprising a plurality of protrusions arrayed in the extension direction of the lens structures; and
   a second protrusion part disposed on the lens structures and comprising a plurality of protrusions arrayed in an array direction, the array direction of the second protrusion part forming an angle θ with the extension direction of the lens structures, wherein both of the first protrusion part and the second protrusion part are on the upper side of the lens structures to function as spacers, wherein in at least one lens structure, at least one protrusion of the second plurality of protrusions is between two adjacent protrusions of the first plurality of protrusions, and a distance between the at least one protrusion of the second plurality of protrusions and a first of the adjacent protrusions is different from a distance between the at least one protrusion of the second plurality of protrusions and a second of the adjacent protrusions, wherein the angle θ satisfies Formula below:

Formula=15°≤θ≤25°, the first protrusion part satisfies Formula 1 below, $$P_{1,x}=P_{1,y}=n_1 \times P_L, \quad \text{[Formula 1]}$$

the second protrusion part satisfies Formulas 2 and 3 below, $$P_{2,x}=(n_{2,x} \times P_L)/\cos\theta > 0, \quad \text{[Formula 2]}$$

$$P_{2,y}=(n_{2,y} \times P_L)/\sin\theta > 0, \quad \text{[Formula 3]}$$

where: $P_{1,x}$ denotes a distance between the protrusions of the first protrusion part in a direction perpendicular to the extension direction of the lens structures, $P_{1,y}$ denotes a distance between the protrusions of the first protrusion part in the extension direction of the lens structures, $n_1$ denotes an integer of 1 or greater, $P_L$ denotes a pitch between the lens structures, $P_{2,x}$ denotes a distance between the protrusions of the second protrusion part in a direction perpendicular to the array direction of the second protrusion part, $n_{2,x}$ denotes an integer closest to $n_{2,y}/\tan\theta$, θ denotes an angle between the array direction of the second protrusion part and the extension direction of the lens structures, $P_{2,y}$ denotes a distance between the protrusions of the second protrusion part in the array direction of the second protrusion part, and $n_{2,y}$ denotes an integer.

10. The backlight unit of claim 9, further comprising at least one of a spread film and a protective film.

11. A display device comprising the backlight unit of claim 9.

12. The backlight unit of claim 9, wherein the at least one protrusion of the second plurality of protrusions and the adjacent protrusions are positioned at a peak of the one lens structure.

13. The backlight unit of claim 9, wherein at least one protrusion of the second plurality of protrusions is positioned at a peak of the one lens structure.

14. A backlight unit comprising:
a light source;
a spread plate disposed over the light source, and spreading light emitted from the light source; and
a condensing film disposed over the spread plate, wherein the condensing film comprises:
a plurality of lens structures extending in an extension direction on a surface thereof;
a first protrusion part disposed on the lens structures and comprising a plurality of protrusions arrayed in the extension direction of the lens structures; and
a second protrusion part disposed on the lens structures and comprising a plurality of protrusions arrayed in an array direction, the array direction of the second protrusion part forming an angle θ with the extension direction of the lens structures, wherein both of the first protrusion part and the second protrusion part are on the upper side of the lens structures to function as spacers, wherein in at least one lens structure, at least one protrusion of the second plurality of protrusions is between two adjacent protrusions of the first plurality of protrusions, and a distance between the at least one protrusion of the second plurality of protrusions and a first of the adjacent protrusions is different from a distance between the at least one protrusion of the second plurality of protrusions and a second of the adjacent protrusions, wherein the angle θ satisfies Formula below:

Formula=15°≤θ≤25°, the first protrusion part satisfies Formula 1 below, $$P_{1,x}=P_{1,y}=n_1 \times P_L, \quad \text{[Formula 1]}$$

the second protrusion part satisfies Formulas 2 and 3 below, $$P_{2,x}=(n_{2,x} \times P_L)/\cos\theta > 0, \quad \text{[Formula 2]}$$

$$P_{2,y}=(n_{2,y} \times P_L)/\sin\theta > 0, \quad \text{[Formula 3]}$$

where: $P_{1,x}$ denotes a distance between the protrusions of the first protrusion part in a direction perpendicular to the extension direction of the lens structures, $P_{1,y}$ denotes a distance between the protrusions of the first protrusion part in the extension direction of the lens structures, $n_1$ denotes an integer of 1 or greater, $P_L$ denotes a pitch between the lens structures, $P_{2,x}$ denotes a distance between the protrusions of the second protrusion part in a direction perpendicular to the array direction of the second protrusion part, $n_{2,x}$ denotes an integer closest to $n_{2,y}/\tan\theta$, θ denotes an angle between the array direction of the second protrusion part and the extension direction of the lens structures, $P_{2,y}$ denotes a distance between the protrusions of the second protrusion part in the array direction of the second protrusion part, and $n_{2,y}$ denotes an integer.

15. The backlight unit of claim 14, further comprising at least one of a spread film and a protective film.

16. The backlight unit of claim 14, wherein the at least one protrusion of the second plurality of protrusions and the adjacent protrusions are positioned at a peak of the one lens structure.

17. The backlight unit of claim 14, wherein at least one protrusion of the second plurality of protrusions is positioned at a peak of the one lens structure.

\* \* \* \* \*